United States Patent

[11] 3,621,364

[72] Inventor Frederick E. Worster
Highland Park, Ill.

[21] Appl. No. 74,667
[22] Filed Sept. 23, 1970
[45] Patented Nov. 16, 1971
[73] Assignee Warwick Electronics Inc.

[54] FAULTY ELECTRICAL COMPONENT SENSING AND PROTECTION APPARATUS
6 Claims, 1 Drawing Fig.

[52] U.S. Cl. ........ 321/11, 307/317, 315/1, 315/3
[51] Int. Cl. ........ H02m 1/18
[50] Field of Search ........ 307/317; 315/1, 3; 321/2 HF, 11, 12, 14

[56] References Cited

UNITED STATES PATENTS

| | | | |
|---|---|---|---|
| 2,882,425 | 4/1959 | Rodman | 307/317 X |
| 2,993,128 | 7/1961 | Carroll | 307/317 X |
| 3,121,200 | 2/1964 | Samson | 307/317 X |
| 3,128,394 | 4/1964 | Bianchi | 307/317 X |
| 3,141,098 | 7/1964 | Ravenhill et al. | 307/317 X |
| 3,445,717 | 5/1969 | Eckenbrecht et al. | 315/22 |

*Primary Examiner*—William M. Shoop, Jr.
*Attorney*—Hofgren, Wegner, Allen, Stellman & McCord

ABSTRACT: A diode is coupled in series with the high-voltage regulator of a television receiver and is normally forward biased by the current therethrough. A disabling bias potential source is coupled across the diode to reverse bias the same when the regulator current disappears due to the failure or removal of the regulator. The diode is further coupled to the horizontal-scan system such that when the disabling bias appears across the diode due to regulator failure or removal, the scan system will be disabled by the disabling bias potential.

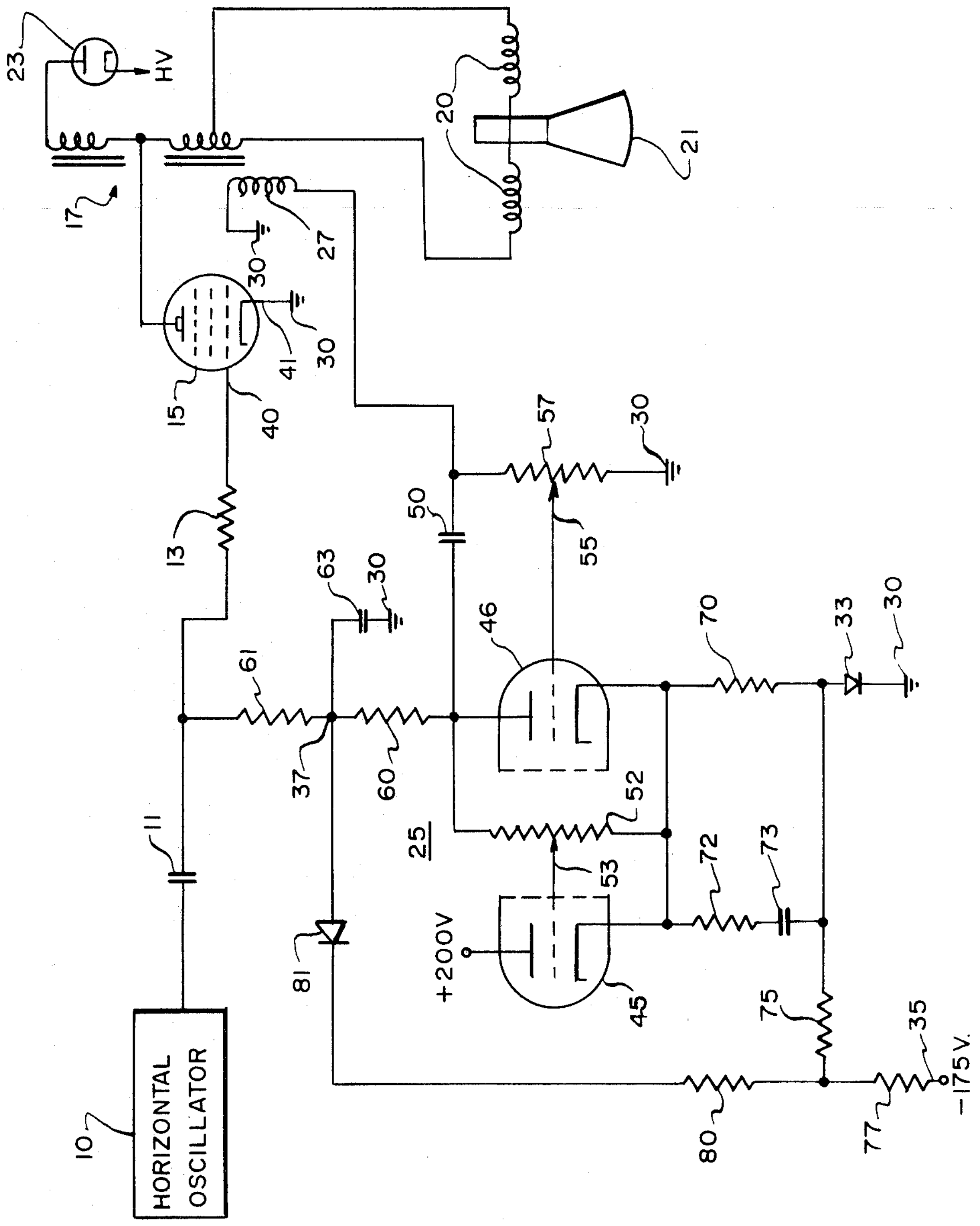
INVENTORS
FRED E. WORSTER
JOHN G. KONOPKA
BECHERA ABOUFADEL
BY Hofgren, Wegner, Allen, Stellman & McCord
ATTORNEYS

FAULTY ELECTRICAL COMPONENT SENSING AND PROTECTION APPARATUS

This invention relates to a novel faulty circuit component-sensing means and particularly to novel apparatus for sensing the failure or removal of an electrical component and to thereupon cause the cessation of operation of another component of the electrical circuit to prevent any damage which the failure or removal of that one component may cause.

More specifically, the present invention relates to a protection circuit for a television receiver which includes apparatus for sensing the failure of a component therein, wherein during normal operation thereof, the component serially conducts a first level of current above a predetermined minimum and during the failure or removal of the component, the series current falls to a second lower level of current below a predetermined maximum which level, of course, could be zero.

In accordance with the present invention, a diode or similar unidirectionally conductive device having a low forward-conjuction impedance and high reverse-conduction impedance, is connected in series between said component and a source of reference potential in such a manner as to conduct the current through said component in the diodes forward direction. A source of disabling bias potential is coupled to the anode of the diode and is of a polarity which tends to reverse bias the diode. The magnitude of the Thevinen-equivalent-current source, however, is less than the current flowing through said component during normal operation and, thus, the diode is forward biased thereby and clamps the anode thereof to the reference potential.

When the component fails or is removed, the current therethrough falls below the maximum lower level. This lower level is also below the current source value of the source of disabling bias potential which, consequently, reverse biases the diode causing the anode thereof to increase towards the potential of said disabling bias potential source. The anode of this diode is coupled to another selected component, the continued operation of which would be directly or indirectly undesirable, to thereby cause that component to cease operation or reduce the operation thereof to a safe level.

The present invention is particularly useful in color television receivers wherein failure or removal of the component which regulates the extremely high voltage for the ultor electrode can result in that high voltage rising to unacceptably high levels. In most conventional television receivers, a flyback high-voltage supply is employed wherein high amplitude flyback pulses, generated in the flyback transformer in response to the output of the horizontal oscillator, are rectified to produce the high voltage for the ultor electrode of the picture tube. The output of the horizontal oscillator is conventionally coupled to the flyback transformer by a horizontal output amplifier such as a vacuum tube pentode. The high voltage produced in this manner in color television receivers must be maintained relatively constant and to this end, a regulator, generally of the shunt- or feedback-type is generally provided.

In accordance with a preferred embodiment of this invention, a diode is coupled in series with the voltage regulator and a disabling bias is coupled to the anode, the anode of the diode being further coupled to the control grid of the horizontal output tube of the television receiver. The disabling bias source is sufficiently negative such that when the diode becomes reversed biased during the failure or removal of the voltage regulator, the horizontal output tube current will be reduced, thus resulting in the reduction of the output drive current which produces the high voltage.

This invention may be better understood by referring to the following detailed description and the accompanying drawing which illustrates in partial schematic diagram form, a preferred embodiment of the present invention.

While an illustrative embodiment of the invention is shown in the drawing and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values and type designations will be given for certain of the components in order to disclose a complete, operative embodiment of the invention. However, it should be understood that such values and type designations are merely representative and are not critical unless specifically so stated. The scope of the invention will be pointed out in the appended claims.

The invention is disclosed as incorporated in the horizontal scan circuit of a television receiver, and is particularly useful therein as has been previously discussed. For the present disclosure, only so much of a television receiver is described as is necessary for an understanding of the invention, the remaining portion of the television receiver being of know configuration. It is to be understood, however, that the invention may be used in other and different types of circuits wherein, the cessation or limiting of the operation of one component in response to the failure or removal of another component is desired.

Turning to the single figure, a horizontal scan system is illustrated for a television receiver. A horizontal scan oscillator 10 operates at a line scanning frequency of 15,570 Hertz. The output of horizontal oscillator 10, which may be synchronized with horizontal synchronizing information in the received television signal is connected through a capacitor 11 and a limiting resistor 13 to the grid of a horizontal output amplifier 15. The output of amplifier 15, in the form of a sawtooth scan current is coupled to an autotransformer such as a flyback transformer 17, connected to horizontal-scanning coils 20 associated with a television-type cathode-ray tube (CRT) 21. A high voltage rectifier 23, also coupled to flyback transformer 17, generates high voltage HV for CRT 21. A source of B+ operating potential (not shown) is coupled to the plate of amplifier 15 through the flyback transformer in the conventional manner.

To control both the amplitude of the high voltage HV generated by rectifier 23, and the width of the horizontal raster on CRT 21, a regulator circuit 25 of the feedback-type is connected in the horizontal-scan system. An additional winding 27 on flyback transformer 17 forms the input to regulator 25, thereby supplying input pulses in synchronism with the horizontal flyback pulses. Regulator 25 is connected in shunt between the control grid of amplifier 15 and a source of reference potential or ground 30. As will appear, the amplitude of the positive going flyback pulses from winding 27 varies in inverse proportion to the load which the CRT presents. The regulator 25 is responsive to a change in the amplitude of pulses from winding 27 to change the amount of current conduction through the regulator, thereby changing the negative bias on the grid of horizontal output tube 15. As the magnitude of the positive going pulses increases, the negative bias also increases to cause amplifier 15 to decrease the energy transmitted to the flyback transformer. As the magnitude of the pulses decreases, the opposite effect occurs to thereby maintain the magnitude of the high voltage, which varies in inverse proportion to the load which the CRT presents, at a constant level.

Should the regulator 25 fail in such a manner as to reduce the current flow therethrough to a very low level, the negative bias voltage on the grid of amplifier 15 would decrease in a positive going direction and thereby cause or allow the high voltage to exceed acceptable levels. Should the regulator tubes be removed, the current would drop to zero and the negative bias on amplifier 15 would disappear. This, in turn, would permit the high voltage to again increase and would eventually result in the destruction of the horizontal output tube 15 due to the destructive conduction therein. The protection circuit to be described operates to prevent these effects of failure or removal of the regulator elements.

In accordance with the present invention, a protection circuit is provided which interconnects with and uses a common components of the conventional horizontal-scan system described above. The protection circuit includes a unidirectional conduction device 33, such as a semiconduction diode, connected in series between regulator 25 and a reference potential such as ground in such a manner that current through the regulator must flow through the diode in its forward conduction direction. The anode of diode 33 is connected through resistor 75 to a source 35 of negative potential, such as −175 volts. The disabling bias-potential source may be any conventional source of DC potential which is independent of the horizontal-scan system, so that DC potential is generated when the high voltage HV and/or the horizontal scan current fails. Thus, source 35 may be associated with the conventional low-voltage DC source for a television receiver. The magnitude of resistor 75 and the internal impedance of source 35 are selected such that the magnitude of the Thevinen-equivalent-current source is less than the nominal value of current conducted by regulator 25 and greater than the level of current which would indicate failure of the regulator.

Thus, when the system is operating properly, diode 33 if forward biased, clamping terminal 71 to ground 30. When the regulator fails or is removed, diode 33 is no longer forward biased, unclamping terminal 71 to allow a large negative disabling bias to appear at the anode of diode 33. The negative bias signal is coupled to the grid of amplifier 15 through common resistor 70 voltage dividing resistors 51 and 52 and resistors 60, 61 and 13 to reduce conduction therein to a safe level or completely cut off the amplifier and collapse the horizontal raster. This prevents the generation of dangerously high voltages and indicates that a malfunction has occurred, and prevents a viewer from attempting to watch a picture of CRT 21. It should be noted that the protection circuit will work equally well with other types of regulators, and with regulators located in other conventional places in the horizontal-scan system. For example, a regulator could be connected to high-voltage rectifier 23 and in shunt with CRT 21, and have a similar protection circuit connected in the series therewith. In response to failure of the rectifier, the protection circuit would generate a similar failure signal and disable the horizontal output amplifier 15.

Considering the circuit in more detail, amplifier 15 is in the form of a pentode electron tube, such as a 6JE6, having a control grid electrode 40 coupled to resistor 13, and a cathode electrode 41 coupled directly to ground 30. The plate electrode 42 is connected to an intermediate point on the winding of the flyback transformer 17. The remaining electrodes may be connected in a conventional manner (not illustrated) for horizontal output tubes of this known-type.

Regulator 25 consists of a first triode 45 and a second triode 46, which pair of triodes are contained within a single tube envelope, as in a type 12AX7A. Positive-going pulses from winding 27 are coupled through a 0.001 microfarad capacitor 50 to the plate of triode 46. The plate and the cathode of triode 46 are shunted by a voltage divider comprising a 470-kilohm resistor and a 8.6-kilohm resistor 52, the junction of which is directly coupled to the grid of triode 45 by lead 53. The plate of triode 45 is directly connected to a source of positive DC voltage, such as +200 volts. The grid of triode 46 is connected to a wiper 55 of a high-voltage-adjustment potentiometer 57, as 90 kilohms resistance from ground 30 to a junction point between capacitor 50 and winding 27. The wiper 55 of potentiometer 57 adjusts the high voltage by setting an average bias for horizontal output tube 15, which in turn governs the power delivered to the horizontal-deflection windings 20.

To connect regulator 25 to the grid-biasing circuit of amplifier 15, a pair of resistors 60 and 61, 270 kilohms and 1 megohm, respectively, are connected from the plate of triode 46 to the junction between capacitor 11 and resistor 13. The junction between resistors 60 and 61 is bypassed to ground 30 through a 0.022-micromicrofarad capacitor 63.

The return ground path for regulator 25 includes a portion of the protection circuit. Both cathodes of triodes 45 and 46 are coupled together, and through a common cathode resistor 70, as 33 kilohms, to the anode of diode 33. The cathode of diode 33 is directly connected to ground 30. Resistor 70 is shunted by a series-connected 33-kilohm resistor 72 and 0.01-micromicrofarad capacitor 73. In addition to diode 33, the protection circuit includes a 4.7-megohm resistor 75 connected from the anode of diode 33 to negative bias DC source 35.

In operation, regular 25 substantially reduces high-voltage variations in the horizontal-scan system. Regulator 25 receives positive feedback pulses from winding 27. Most of the positive pulse is applied directly to the plate of triode 46, but a portion is applied through potentiometer 57 to the grid of triode 46, driving the triode 46 into conduction. The series capacitor 50 charges during the duration of the positive pulse to create a negative-bias potential, at the junction of capacitor 50 and resistor 60, when the flyback pulse disappears. Resistor 60 and capacitor 63 function to smooth out the pulsating negative-bias potential, so that a smooth negative bias is coupled through resistors 61 and 13 to the grid 40 of amplifier 15.

Regulator triode 45 is used to accentuate the changes in feedback pulse amplitude. When the load presented by the CRT 21 increases, the feedback pulse amplitude decreases, and the negative potential at junction 38 similarly decreases. The resulting change of potential on lead 53, which is in a positive-going direction, causes triode 45 to increase conduction, which in turn increases the voltage across common-cathode resistor 70. The increasing cathode voltage causes a net increase in the grid to cathode bias of triode 46, and a resulting decrease of conduction therethrough, raising the potential at the plate of triode 46 in a positive going direction. This decrease in negative potential is coupled through resistors 60, 61 and 13 to grid 40, reducing the negative bias on horizontal output amplifier 15 and thus increasing the power delivered to flyback transformer 17. The increased power tends to offset the voltage decrease caused by the increased load of CRT 21. When the combination regulator fails, loses emission, or is removed, the current therethrough will fall below the current source value of the disabling bias potential source. In the case of complete failure or removal, the regulator current will fall to zero. Under any of these circumstances, diode 33 will be reversed biased and the voltage at the anode thereof will increase towards the value of the disabling bias-potential source 35.

The increased negative potential will be coupled through common resistor 70, voltage-dividing resistors 51 and 52 and resistors 60, 61 and 13 to the grid of pentode 15 to thereby reduce conduction therein to a safe level or completely cut off the amplifier to thereby prevent the production of excessive high voltage and damaging conduction in the pentode 15. When the failure is corrected or the regulator replaced in its socket, the circuit will resume normal operation.

We claim:

1. In a television receiver having at least one component that conducts current at first level during the normal operation thereof and at a second and substantially lower second level during failure or upon removal thereof, said receiver further having at least one other component the continued operation of which after the failure or removal of said at least one component is undesirable, the improvement comprising:

a unidirectionally conductive device having a low forward-conduction impedance and high reverse-conduction impedance;

means connecting said unidirectionally conducting device in series between said at least one component and a point of reference potential, said device being poled to conduct said first level of current in its forward direction;

a source of disabling bias potential;

means coupling said source of disabling bias potential to said unidirectionally conductive device with such polarity as to tend to reverse bias said device, said disabling bias-potential source having an internal impedance such that the magnitude of the Thevinen-equivalent-current source is less than said first level of current and greater than said second level of current whereby said device, during normal operation of said at least one component is forward biased and has a low voltage drop thereacross, and during the failure or removal of said at least one component is reversed biased and has a disabling voltage at least approaching to voltage of said source of disabling bias potential appearing thereacross:

and means responsive to the appearance of said disabling bias voltage across said unidirectionally conductive device for preventing the continued operation of said at least one other component.

2. The apparatus of claim 1 wherein said at least one component comprises the high-voltage regulator of said television receiver and said at least one other component comprises the horizontal output amplifier of said television receiver and further wherein said unidirectionally conductive device comprises a semiconductor diode and said means responsive to said disabling bias voltage comprises means for coupling the voltage across said diode to said horizontal output amplifier to bias said amplifier into cutoff when the disabling bias voltage appears across said diode.

3. The apparatus of claim 2 wherein said diode is connected anode-to-cathode between said regulator and said reference potential and further wherein said source of disabling bias potential is negative with respect to said reference potential and is coupled to the anode of said diode.

4. The apparatus of claim 3 wherein said means responsive to said disabling bias voltage for preventing continued operation of said horizontal output amplifier comprises a direct current conductive path between the anode of said diode and amplifier.

5. The apparatus of claim 4 wherein said horizontal output amplifier comprises a pentode-type vacuum tube and further wherein said direct-current conductive path is coupled to the grid of said pentode whereby when the potential at the anode of said approaches the magnitude of said negative disabling bias potential, said pentode will be biased into its cutoff region.

6. The apparatus of claim 5 wherein said high-voltage regulator comprises a feedback-type regulator, responsive to pulses, inversely proportional to the load which the cathode-ray tube of said television presents, to generate the necessary negative operative bias for said horizontal output amplifier and to vary said bias in accordance with amplitude of said pulses.